United States Patent [19]

Bückner et al.

[11] Patent Number: 4,808,766

[45] Date of Patent: Feb. 28, 1989

[54] OSCILLATION DAMPENER FOR AERIAL ELECTRICAL TRANSMISSION LINES AND LINE EQUIPPED THEREWITH

[75] Inventors: Walter F. Bückner, Augustenstr. 8, 7068 Urbach; Martin Schuster, Esslingen, both of Fed. Rep. of Germany

[73] Assignee: Walter F. Bückner, Urbach, Fed. Rep. of Germany

[21] Appl. No.: 63,880

[22] Filed: Jun. 19, 1987

[30] Foreign Application Priority Data

Jun. 20, 1986 [DE] Fed. Rep. of Germany ....... 3620727

[51] Int. Cl.4 .............................................. H02G 7/14
[52] U.S. Cl. ..................................................... 174/42
[58] Field of Search ................................... 174/42, 146

[56] References Cited

U.S. PATENT DOCUMENTS 1,941,731  1/1934  Austin .................................... 174/42
2,374,823  5/1945  Leib et al. ............................. 174/42

FOREIGN PATENT DOCUMENTS

| 836211 | 4/1952 | Fed. Rep. of Germany | 174/42 |
| 2742843 | 4/1979 | Fed. Rep. of Germany | 174/146 |
| 1224950 | 2/1960 | France | 174/146 |
| 1575679 | 7/1969 | France | 174/144 |
| 2412187 | 7/1979 | France | 174/146 |
| 2547961 | 12/1984 | France | 174/42 |
| 2556892 | 6/1985 | France | 174/42 |
| 53-24596 | 3/1978 | Japan | 174/42 |

*Primary Examiner*—Laramie E. Askin
*Attorney, Agent, or Firm*—Dickstein, Shapiro & Morin

[57] ABSTRACT

A design for dampening cable oscillations in aerial transmission lines includes an auxiliary cable (4), each end of which is connected to a respective clamp (6) by means of rubber elastic molded elements, which clamps (6), in turn, are to be connected with the conductor cable (1).

22 Claims, 2 Drawing Sheets

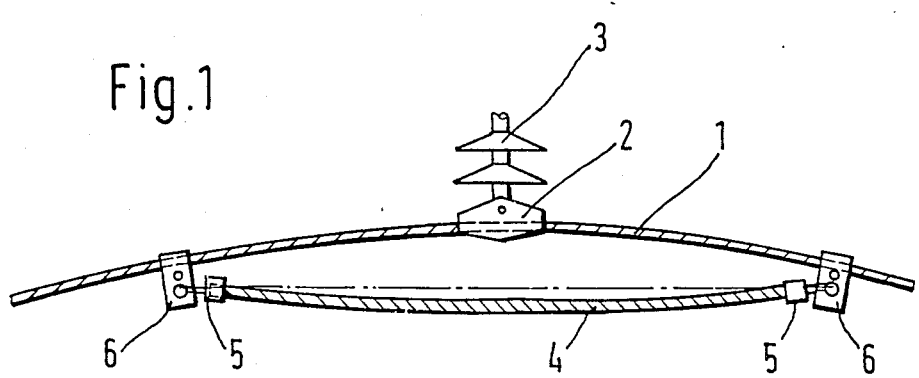
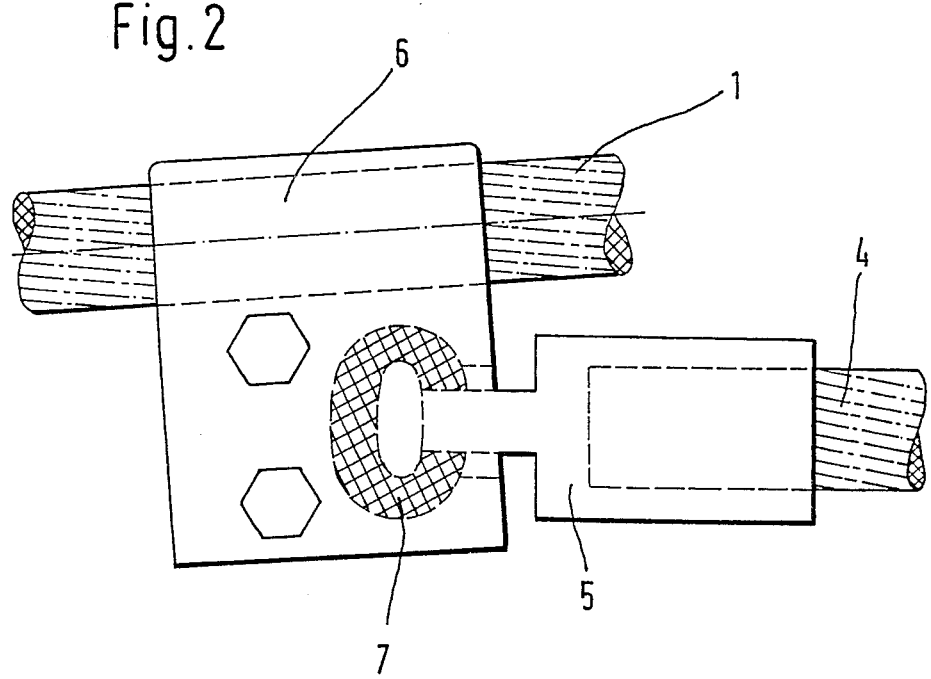

OSCILLATION DAMPENER FOR AERIAL ELECTRICAL TRANSMISSION LINES AND LINE EQUIPPED THEREWITH

BACKGROUND OF THE INVENTION

The object of the invention is a design for dampening oscillations in aerial electrical cables by means of a secondary cable which is located beneath the conductor cable at both sides of the cable hanger and is provided at each end with a rubber pin ball connected to the conducting cable by means of a clamp.

PRIOR ART

The cables of aerial electrical transmission lines must be protected from wind-generated oscillation, particularly at the points where they meet clamps. Today this is primarily accomplished by means of oscillation dampeners of various designs. Depending on the design, such oscillation dampeners can fulfill their purpose in a variety of ways, namely through:

1. Energy dissipation, i.e. physical dampening of the conductor cable oscillation,
2. Oscillation suppression by means of interference between the oscillating structures (e.g. stabilization tank on a passenger ship; Stockbridge dampeners for aerial transmission line oscillations)
3. Passing the oscillation energy on to adjacent spans of the transmission line through or at the hanger clamps; thus reducing oscillation at the point of origin.

The ideal dampener will combine all of these requirements to one degree or another.

Oscillation dampeners of the "Stockbridge" type, first used in 1925, are now widely used. They are mounted at a distance from the hanger clamp corresponding to approximately half the wavelength of the most common cable oscillation. They generally consist of 2 weights attached to the ends of a 0.4 to 0.8 m steel cable. The cable with these weights is attached approximately to the center of the conductor cable by means of clamps. When the cable oscillates, this dampener is also caused to oscillate. As a result of the interference between the two coupled oscillating structures, there is a partial suppression of the conductor cable oscillation and, to a lesser degree, also a consumption of energy, i.e. a physical dampening in the oscillating steel cable, which results in a corresponding dampening of the conductor cable oscillation. An optimal tuning of this type of dampener to the broad range of frequencies and amplitudes and the different types of aerial transmission line cable is extremely difficult and in part impossible. This was demonstrated by cable damage despite the use of Stockbridge dampeners in countries where the strength of the wind resulted in local and periodic uniformity of the dangerous wind-generated cable oscillations.

Secondly, mention should be made of the "Bretelle" dampeners used prevalently in France since about 1965. They consist of a piece of cable, usually a piece of the conductor cable, 1.5 to 4 m long, which is connected to the conductor cable with clamps to the left and right of the hanger clamp. It is thus placed below the conductor cable as an auxiliary cable with low tension. With varying degrees of effectiveness, the Bretelle dampener fulfills all three of the above-mentioned requirements for oscillation dampeners of aerial transmission line cables.

1. It dissipates more energy than the Stockbridge dampener as a result of the substantially larger internal dampening per meter of the aluminum or steel-aluminum auxiliary cable as opposed to the relatively thin and short steel cable of the Stockbridge dampener.

2. It suppresses, because there is interference between the auxiliary cable oscillation and the conductor cable oscillation. However, the suppression is not as great as in the Stockbridge dampener, but is not as hard on the conductor cable because the moments introduced into the cable plane of the conductor cable are not as large as in the Stockbridge dampener.

3. It transfers a large portion of the oscillation energy from one span to the next and from further onward until the energy is consumed. One finds this characteristic among cable-type dampeners only in "Bretelle" dampeners. Among hanger clamps this characteristic is found in designs which hold the cable with several vertically movable clamps (German Pat. No. 1 665 379).

Other designs for dampening oscillations in the conductor cable at the hanger clamp, the most prevalent location of cable breaks, have not been able to prove themselves in practice.

In bundled conductors, designs have been developed which both maintain the necessary spacing of the cables between the hanger clamps at the masts and contain oscillation dampening elements made from shaped rubber.

In this manner the cable oscillation is reduced in the initial span and does not first become massive at the hanger clamp. This area is still developing, although it must be noted that with bundled conductors, the coupling of the cables by means of spacers automatically provides a certain reduction in the maximum, i.e. dangerous, intensity of the oscillation, regardless of the design employed.

Under difficult wind conditions and when bundled conductors are used that are in special need of protection, however, additional dampeners should be provided in the vicinity of the hanger clamps on each individual cable.

The dampening of the cable oscillations for individual cables is in need of improvement today both for difficult wind conditions and in general, with a view toward fool-proof planning and utilization.

The content of this patent application is the connection of the "Bretelle" dampener with the rubber or elastic molded elements that have been used and tested for years in spacers for bundled conductors.

BRIEF DESCRIPTION OF THE DRAWINGS

FIG. 1 is a pictorial diagram of the oscillation dampener of the present invention;

FIG. 2 is a pictorial diagram of a clamp for use with the present invention.

DETAILED DESCRIPTION OF THE PREFERRED EMBODIMENT

Figure 3:
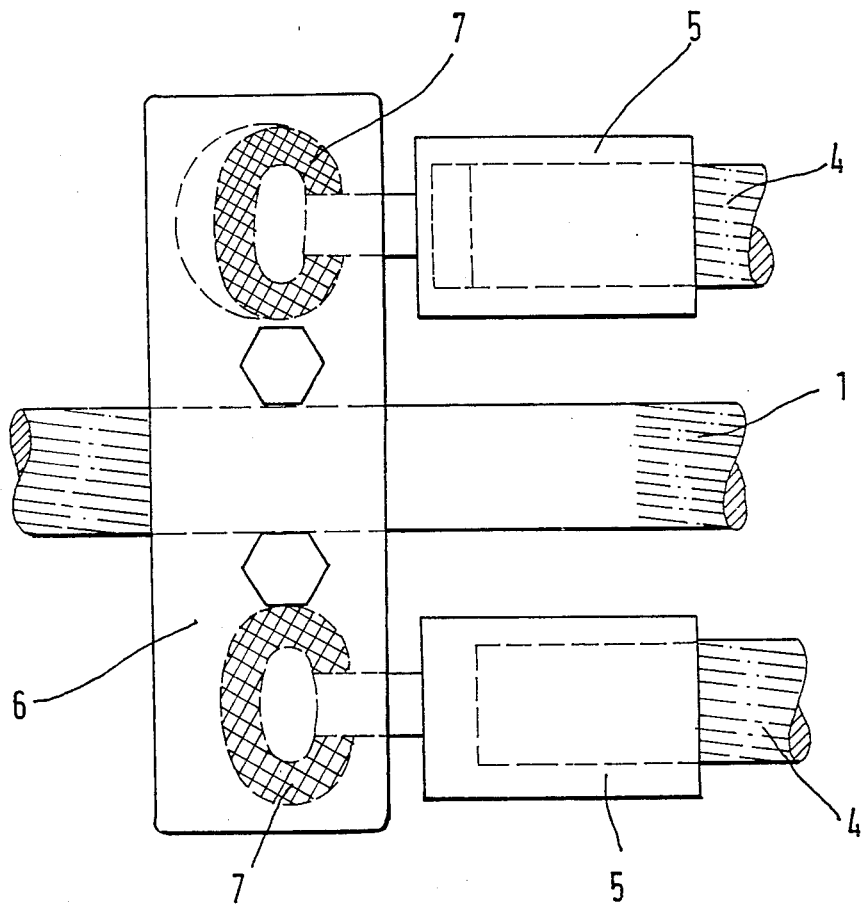
FIG. 3 is an alternative embodiment of the clamp of FIG. 2 for use with two auxiliary cables.

FIGS. 1 and 2 illustrate this design. The conductor cable (1) of the aerial transmission line is connected to the insulator chain (3) by means of hanger clamps (2). The auxiliary cable (4) is disposed beneath the conductor cable and is clamped or pressed into a fitting (5) at each end. This fitting carries an elastic molded element (7) at its other end, which elastic molded element (7) is surrounded and held by the clamp (6) and is coupled to the conductor cable (1). The auxiliary cable is thus non-positively but elastically connected with the conductor cable.

The new design combines the above-described advantages of the Bretelle dampener with the high level of dampening, effective at all oscillation frequencies, of the rubber elastic molded elements.

Due to the high level of energy dampening of the rubber elastic elements, the arrangement according to FIGS. 1 and 2 results in an increase of the physical dampening over the entire frequency range of the oscillating cable, and, thus, in a more comprehensive dissipation of dynamic energy than is provided by the Bretelle dampener.

On particularly endangered transmission lines, the dampening can be adapted to increased requirements by increasing the number of rubber elastic molded elements connected parallel to each other or in series.

Transmission of the cable oscillations into the adjacent cable span at the endangered section of cable at the hanger clamp is assured in the same manner as with the Bretelle dampener, as is the suppression characteristic, which is increased by the use of the rubber elastic structural elements.

In application, the economical manufacture and assembly of the design is of particular significance.

The dampener design is comprised of tested structural elements, is easy to assemble and, due to its high level of internal dampening over the entire practical frequency range, i.e. over the entire range of application, is optimally useable, even with the most severe wind-generated cable oscillations.

It is easy to determine its dimensions and does not result in the great difficulties known in determining the type and position of Stockbridge dampeners.

We claim:

1. An apparatus for attachment to an aerial transmission line cable suspended by a hanger from a tower for dampening oscillations of said aerial transmission line cable, comprising:
   an auxiliary cable for connection to said aerial transmission line cable, said auxiliary cable having a fitting connected to one end thereof, said fitting having an elastically molded element; and
   a first clamp having a first portion for attachment to said aerial transmission line cable on one side of said hanger and a second portion housing said elastically molded element, and a second clamp having a first portion for attachment to said aerial transmission line cable on the other side of said hanger and a second portion attached to said auxiliary cable.

2. The apparatus of claim 1, wherein said elastically molded element is formed of rubber.

3. The apparatus of claim 1, further including at least a second auxiliary cable extending parallel to said auxiliary cable, said second auxiliary cable having a fitting connected to one end thereof, said fitting of said second auxiliary cable having an elastically molded element, and wherein said first clamp also houses the elastically molded element of said second auxiliary cable, and the other end of said second auxiliary cable is attached to said second clamp.

4. The apparatus of claim 1, wherein said auxiliary cable is secured to said fitting by means of compression force.

5. The apparatus of claim 1, wherein both ends of said auxiliary cable have fittings with elastically molded elements and said first and second clamps each has a second portion housing one of said elastically molded elements.

6. The apparatus of claim 1, wherein said fitting has at least two of said elastically molded elements resiliently secured to corresponding housings in said first clamp.

7. The apparatus of claim 1, wherein said fitting is secured to said auxiliary cable by means of clamping.

8. An aerial transmission line cable and dampening system, comprising:
   an aerial transmission line cable suspended from a hanger; and
   an apparatus for providing dampening of oscillations of said aerial transmission line cable;
   said apparatus including an auxiliary cable having a fitting connected to one end thereof, said fitting having an elastically molded element; and a first clamp having a first portion attached to said aerial transmission line cable on one side of said hanger and a second portion housing said elastically molded element, and a second clamp having a first portion attached to said aerial transmission line cable on the other side of said hanger and a second portion attached to said auxiliary cable, said auxiliary cable being positioned below and approximately parallel to said aerial transmission line cable.

9. The system of claim 8 wherein said elastically molded element is formed of rubber.

10. The system of claim 8, further including at least a second auxiliary cable extending parallel to said aerial transmission line cable, said second auxiliary cable having a fitting connected to one end thereof, said fitting of said second auxiliary cable having an elastically molded element, and wherein said first clamp also houses the elastically molded element of said second auxiliary cable, and the other end of said second auxiliary cable is attached to said second clamp.

11. The system of claim 8, wherein said auxiliary cable is secured to said fitting by means of compression force.

12. The system of claim 8, wherein both ends of said auxiliary cable having fittings with elastically molded elements and said first and second clamps each has a second portion housing one of said elastically molded elements.

13. The system of claim 8, wherein said fitting has at least two of said elastically molded elements resiliently secured to corresponding housings in said first clamp.

14. The system of claim 8, wherein said fitting is secured to said auxiliary cable by means of clamping.

15. An aerial transmission line cable and dampening system, comprising:
   an aerial transmission line cable suspended from a hanger; and
   apparatus for providing dampening of oscillations of said aerial transmission line cable;
   said apparatus including an auxiliary cable having a fitting connected to one end thereof, said fitting having an elastically molded element; and a first clamp having a first portion attached to said aerial transmission line cable on one side of said hanger and a second portion housing said elastically molded element, and a second clamp having a first portion attached to said aerial transmission line cable on the other side of said hanger and a second portion attached to said auxiliary cable, said auxiliary cable being positioned beside and approximately parallel to said aerial transmission line cable.

16. The system of claim 15, wherein said elastically molded element is formed of rubber.

17. The system of claim 15, further including at least a second auxiliary cable extending parallel to said aerial transmission line cable, said second auxiliary cable having a fitting connected to one end thereof, said fitting of said second auxiliary cable having an elastically molded element, and wherein said first clamp also houses the elastically molded element of said second auxiliary cable, and the other end of said second auxiliary cable is attached to said second clamp.

18. The system of claim 17, wherein said second auxiliary cable is spaced apart from said auxiliary cable and wherein said aerial transmission line cable is located in a plane between said auxiliary cables.

19. The system of claim 15, wherein said auxiliary cable is secured to said fitting by means of compression force.

20. The system of claim 15, wherein both ends of said auxiliary cable have fittings with elastically molded elements and said first and second clamps each has a second portion housing one of said elastically molded elements.

21. The system of claim 15, wherein said fitting has at least two of said elastically molded elements resiliently secured to corresponding housings in said first clamp.

22. The system of claim 15, wherein said fitting is secured to said first auxiliary cable by means of clamping.

* * * * *